United States Patent [19]

Maresko

[11] Patent Number: 4,844,202
[45] Date of Patent: Jul. 4, 1989

[54] LUBRICATION SYSTEM FOR AND METHOD OF MINIMIZING HEAT REJECTION IN GEARBOXES

[75] Inventor: William A. Maresko, Rockford, Ill.

[73] Assignee: Sundstrand Corporation, Rockford, Ill.

[21] Appl. No.: 101,595

[22] Filed: Sep. 28, 1987

[51] Int. Cl.⁴ .............................................. F16N 21/00
[52] U.S. Cl. ................................. 184/6.12; 184/6.24; 239/590.3; 239/DIG. 23
[58] Field of Search ................... 184/6.12, 6.24, 6.22; 239/DIG. 23, 462, 553.3, 590.3

[56] References Cited

U.S. PATENT DOCUMENTS

| | | |
|---|---|---|
| 1,797,203 | 3/1931 | Bijur . |
| 1,943,014 | 1/1934 | Gleason . |
| 1,972,907 | 9/1934 | Shaw . |
| 2,492,020 | 12/1949 | Thoresen . |
| 2,642,156 | 6/1953 | Gothberg et al. ................. 184/6.22 |
| 3,788,426 | 1/1974 | Hull, Jr. . |
| 4,667,774 | 5/1987 | Roberge ............................ 184/6.12 |

FOREIGN PATENT DOCUMENTS

| | | | |
|---|---|---|---|
| 990237 | 9/1951 | France ................................. | 239/462 |
| 689271 | 3/1953 | United Kingdom ................ | 239/462 |

Primary Examiner—Leonard E. Smith
Attorney, Agent, or Firm—Wood, Dalton, Phillips Mason & Rowe

[57] ABSTRACT

Gearboxes having bearings, gears, splines, and seals have been provided with a continuous flow of lubricating and cooling oil supplied through orifice jet units having orifices of a size to preclude clogging by core sand remaining in the cast housing of a gearbox. This has resulted in excessive oil in the gearbox and excessive heat rejection. An improved lubrication system for minimizing heat rejection in gearboxes has the orifices of the orifice jet units sized to deliver only the required flow to the components in the gearbox and a filter is associated with each of the orifice jet units to preclude core sand entrained in the oil and of a size to block an orifice from reaching an orifice. The method of minimizing heat rejection embodies the determination of only that amount of lubricating and cooling oil flow required for the bearings, gear meshes, splines and seals in the gearbox and sizing the orifices accordingly.

8 Claims, 5 Drawing Sheets

LUBRICATION SYSTEM FOR AND METHOD OF MINIMIZING HEAT REJECTION IN GEARBOXES

DESCRIPTION

1. Field of the Invention

This invention generally relates to a lubrication system for and method of minimizing heat rejection in a gearbox and, more particularly, to such a system and method which selectively sizes the orifices in orifice jet units to provide only that amount of flow of lubricating and cooling oil required for cooling of bearings and other components in order to minimize viscous drag and churning losses in the gearbox.

2. Background of the Invention

A sealed gearbox having gear meshes, shaft bearings, and other components provided with a continuous flow of lubricating and cooling oil in excess of that required for cooling is known in the art. Oil within the gearbox is subject to churning where the oil hits the gears and to windage resulting from action of the gears throwing oil. The churning and windage results in generation of heat as well as generation of heat from viscous drag and, in total, there is substantial gearbox heat rejection because of an excess amount of oil in the gearbox.

One example of such a sealed gearbox is an aircraft accessory drive gearbox and a prior art example of such gearbox is described under the following subheading "Prior Art".

3. Prior Art

Figure 1:
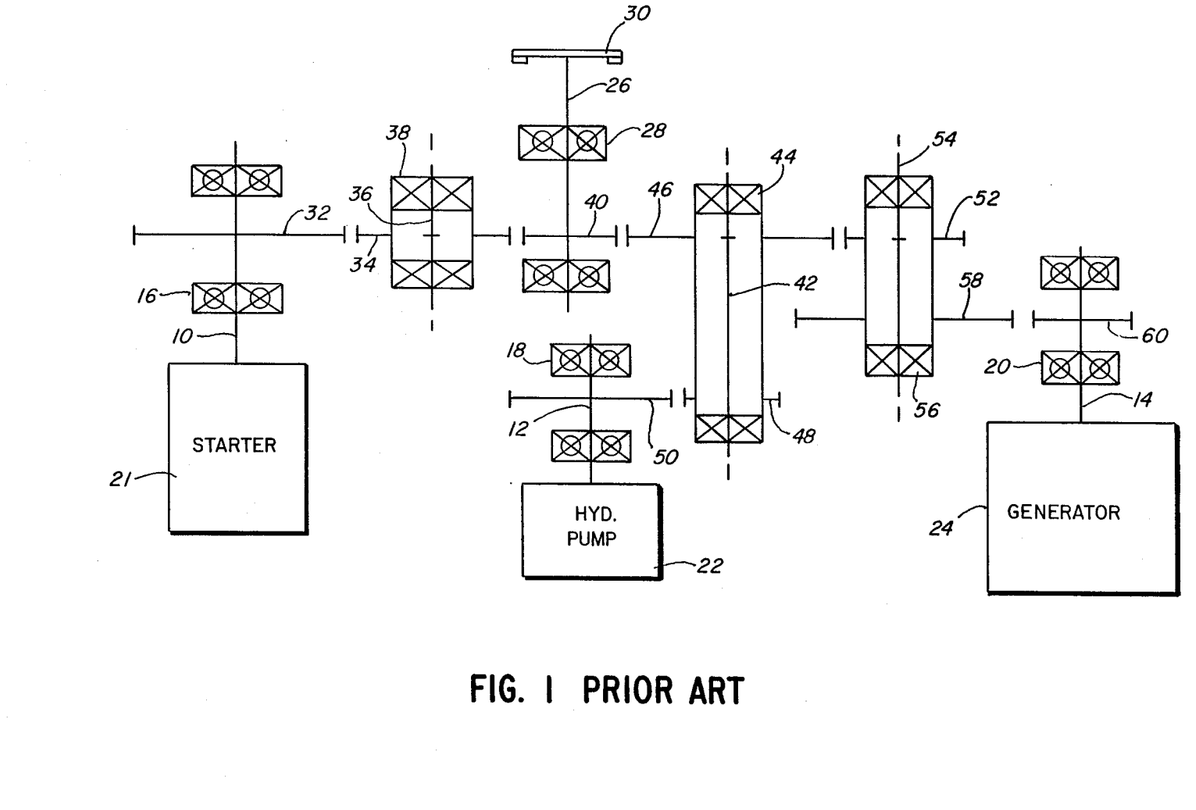
FIG. 1 is a diagrammatic view of a prior art aircraft accessory drive gearbox.
Figure 2:
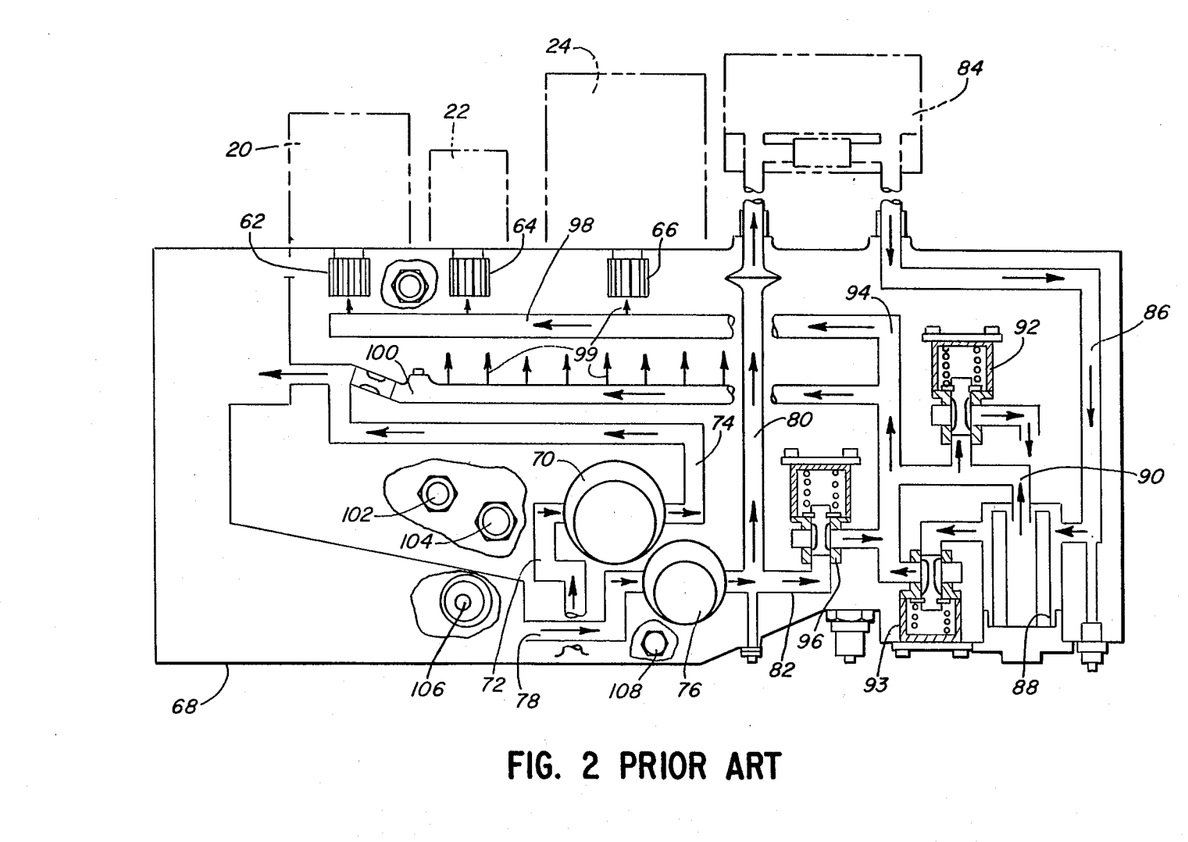
FIG. 2 is a schematic view of the prior art gearbox shown in FIG. 1.
Figure 3:
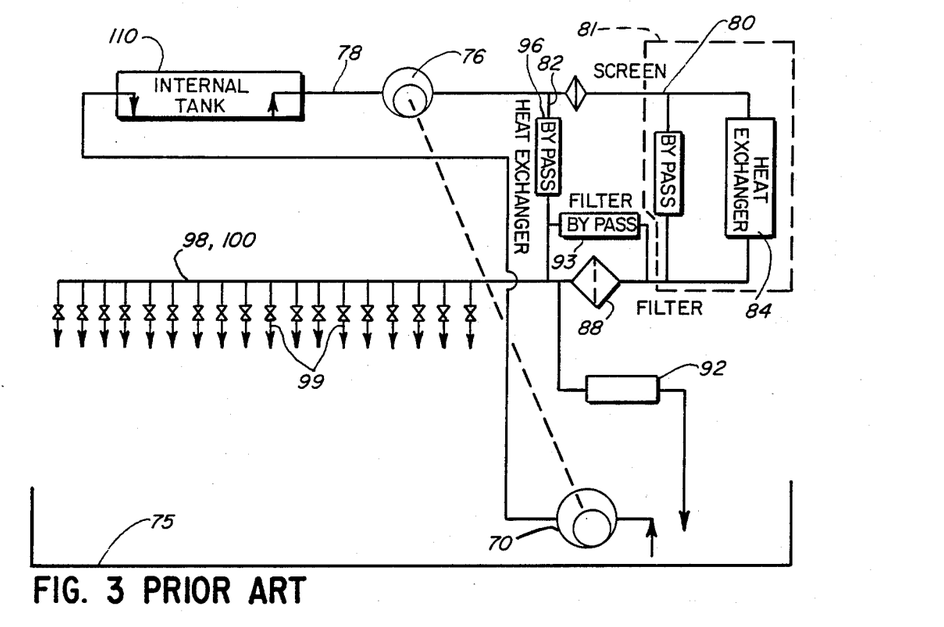
FIG. 3 is a diagrammatic view of the prior art gearbox shown in FIG. 1.

A prior art aircraft accessory drive gearbox is disclosed in FIGS. 1 to 3 of the application in order to facilitate an understanding of the improved lubrication system which minimizes heat rejection.

The illustrated prior art aircraft accessory drive gearbox has three accessory gear shafts rotatably supported by ball bearings within the housing of a gearbox and extending outwardly therefrom. These accessory gear shafts are identified at 10, 12 and 14 and are rotatable in the respective pairs of ball bearings 16, 18 and 20. The accessory gear shaft 10 is connectable to an externally-mounted starter 21. The accessory gear shaft 12 is connectable to an externally-mounted hydraulic pump 22 and the accessory gear shaft 14 is connectable to an externally-mounted generator 24.

A power transmission shaft 26 is rotatably mounted within the housing of the gearbox by a pair of ball bearings 28 and extends outwardly of the housing to provide a connection at 30 to an aircraft engine.

The accessory gear shafts 10, 12 and 14 and the power transmission shaft 26 are drivingly interconnected by gearing within the housing of the gearbox. The accessory gear shaft 10 has a gear 32 which meshes with an idler gear 34 on an idler shaft 36 rotatably mounted by roller bearings 38. The idler gear 34 meshes with a gear 40 on the power transmission shaft 26.

An idler shaft 42 is rotatably mounted by a pair of roller bearings 44 and mounts a pair of idler gears 46 and 48. The idler gear 46 meshes with the gear 40 on the power transmission shaft and the idler gear 48 meshes with a gear 50 on the accessory drive shaft 12 which is shown connected to the hydraulic pump 22. The idler gear 46 meshes with an idler gear 52 on the idler shaft 54 rotatably mounted by a pair of roller bearings 56 and a second idler gear 58 on the idler shaft 54 meshes with a gear 60 on the accessory gear shaft 14, shown connected to the generator 24.

The starter 21, hydraulic pump 22 and generator 24 have spline connections to their associated accessory gear shaft, with these spline connections being shown in prior art FIG. 2 at 62, 64 and 66, respectively. There is also a spline connection for the power transmission shaft 26

As known in the art, the starter 21 can be operated to start an engine. The engine can then drive the hydraulic pump 22 and generator 24 to provide hydraulic and electric power.

A lubrication and cooling medium, such as oil, is supplied to the bearings, the gear meshes between gears, the splines illustrated at 62, 64 and 66, as well as to face seals (not shown) through drilled orifice jet units connected into a lubrication system, particularly illustrated in FIGS. 2 and 3. In FIG. 2, the gearbox housing is represented by a generally rectangular enclosure 68. A scavenge pump 70 having an inlet line 72 and an outlet line 74 scavenges oil from a gearbox sump 75 and returns it to a storage tank, as indicated by the flow arrows in the lines 72 and 74. A lube pump 76 has an inlet line 78 connected to the oil storage tank and an outlet line 80 directing the lube pump flow to an external heat exchanger circuit 81 having an external heat exchanger unit 84 having a bypass valve. Flow from the heat exchanger unit 84 is through a flow passage 86 connected to a filter 88. An outlet line 90 from the filter 88 has a connection to a system relief valve 92 and to a line 94. The line 94 connects to a line 82 via a gearbox heat exchanger bypass valve 96 to receive oil from the lube pump 76. The line 94 also receives oil from the filter 88 via a filter bypass valve 93. The oil under pressure in the line 94 can flow through suitable lines, illustrated diagrammatically in FIG. 2 at 98 and 100 to supply orifice jet units, indicated by the arrows 99 in FIG. 2. The orifice jet units associated with the diagrammatic line 98 lubricate the splines 62, 64 and 66 and the orifice jet units associated with the diagrammatic line 100, supply lubricating oil to the gear meshes and the shaft bearings.

The various lubricating oil external connections as well as a sight glass, are shown associated with a fragmentary part of the housing at 102, 104, 106 and 108.

The prior art circuit disclosed in FIG. 3 illustrates the structure shown in prior art FIG. 2 and includes an internal tank 110 which receives lube oil from the scavenge pump 70 as well as the outflow from the lines 98 and 100 supplying the orifice jet units 99. The internal tank 110 supplies the lube pump 76 through the inlet line 78.

For the aircraft accessory drive gearbox illustrated in FIG. 1, there are 18 orifice jet units, with each of these orifice jet units having an orifice of 0.030" diameter. This orifice diameter is not chosen for desired lubricating flow but is chosen to avoid clogging that might be caused by the presence of contamination, such as residual core sand. Even with thorough cleaning after casting of the housing and oil passages, there can be residual core sand having a maximum particle size of slightly less than 0.030". Using orifices of 0.030" diameter avoids the possibility of clogging the orifices. The requirement of a 0.030" diameter orifice to avoid clogging results in excessive oil at certain locations and partial flooding of the bearings to cause excessive viscous drag and churning and windage losses with resulting excessive heat rejection.

Of the total of 18 orifice jet units, there are two jets which function solely to lubricate a pair of the splines, two orifice jet units function solely to lubricate two of the seals, three of the orifice jet units function solely to lubricate gear meshes, and the remaining 11 orifice jet units are primarily either for the purpose of lubricating bearings or lubricating a seal as well as a spline.

A practical heat sink for reducing the temperature of the lubricating and cooling oil when such a gearbox is used as an aircraft accessory drive gearbox for a supersonic aircraft is the fuel supply. The present invention is directed to reducing the gearbox heat rejection as occurring in the prior art whereby the limited capacity of the fuel supply of a supersonic aircraft is sufficient to function as a heat sink for removal of heat from the lubricating and cooling oil.

SUMMARY OF THE INVENTION

An exemplary embodiment of the invention achieves a reduction in heat rejection from a gearbox by carefully controlling the flow of lubricating and cooling oil to components within the gearbox to provide only that amount of oil required for achieving the necessary lubrication and cooling of the components. More particularly, wherein in the past, orifice jet units have had their orifices sized to preclude clogging thereof by contamination, such as core sand, which remains in the gearbox housing downstream of the main filter after casting, the present invention provides filters in association with the orifice jet units whereby the orifices can be sized to provide only the necessary flow required for lubricating and cooling the components and the filters preclude clogging of the orifices. This results in a substantial reduction in the amount of oil within the gearbox which can be subject to windage and churning losses and viscous drag with resultant minimization of heat rejection.

In the preferred embodiment, each of the orifice jet units has a filter associated therewith in the form of a foraminous screen with openings of a size less than the size of the smallest orifice whereby contamination larger than the orifice entrained in the oil cannot reach the orifices. The orifices of the orifice jet units may thus be reduced to a size substantially less than 0.030" and still provide adequate oil flow. The orifice jet units direct lubricating and cooling oil to the bearings, gear meshes, face seals and splines within the gearbox and the oil collects in a sump for return to a tank for subsequent passage through a heat exchanger and return to the gearbox.

An object of the invention is to provide a lubrication system for a gearbox having bearings, splines and gear meshes, said lubrication system having a plurality of orifice jet units positioned in the gearbox for directing lubricating oil in measured quantities to locations for lubricating said bearings, splines and gear meshes, and means for delivering pressurized lubricating oil to said orifice jet units, the improvement comprising, the orifices of said orifice jet units being of various sizes to deliver only that amount of lubricating oil required at a particular location to minimize churning losses, certain of said orifices being sufficiently small to limit the lubricating oil, and a filter associated with each of the last-mentioned orifice jet units upstream of the orifice to preclude entry of contamination into said orifice.

Still another object of the invention is to provide a method of minimizing heat rejection in a lubricated gearbox having meshing gears, splines and bearings by providing only that amount of lubricant required for cooling thereof comprising calculating and/or determining the heat rejection of said bearings, gear meshes, and splines, locating orifice jet units and sizing the orifices thereof to provide only the required flow of lubricant to said elements, and filtering the lubricant to those orifice jet units having orifices smaller than 0.030" to protect from contamination particles such as core sand that could be in the lubricant and gearbox.

Still further objects, advantages and features of the present invention will become apparent from a consideration of the following specification, taken in conjunction with the accompanying drawings.

DESCRIPTION OF THE PREFERRED EMBODIMENT

Figure 4:
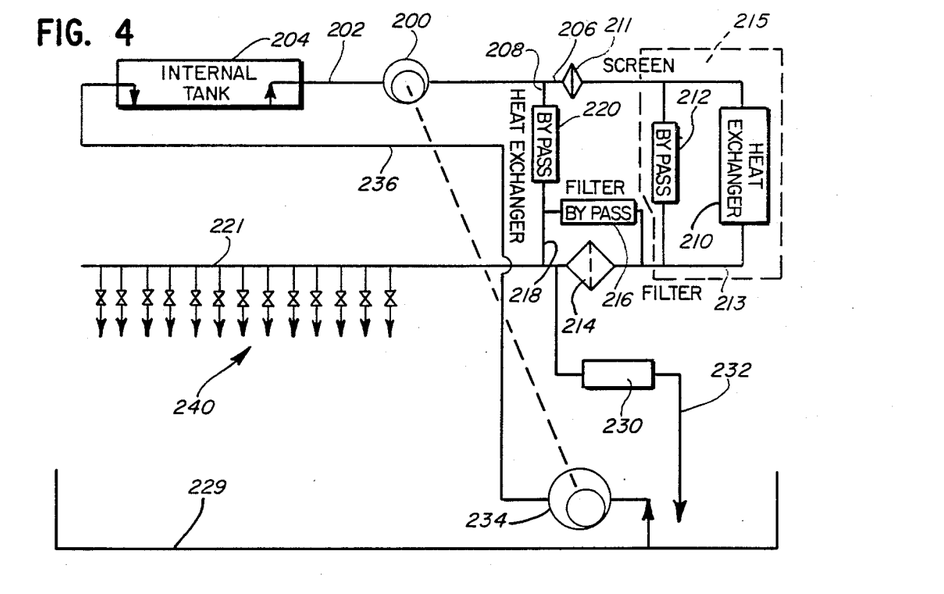
FIG. 4 is a diagrammatic view of the aircraft accessory drive gearbox embodying the present invention.

The new and improved lubricating system which minimizes heat rejection is shown in a diagrammatic view of FIG. 4, similar to the showing of the prior art FIG. 3. The mechanical structure of the gearbox is the same as the prior art gearbox of FIGS. 1 to 3 and the subject matter thereof is incorporated by reference.

A lube pump 200 has an inlet line 202 connected to an internal tank 204 for lubricating oil and delivers the lubricating oil under pressure to a pair of outlet branch lines 206 and 208. The flow through the branch outlet line 206 is through a screen 211 to a heat exchanger unit 210 and to a bypass valve 212 associated therewith in an external heat exchanger circuit 215 and with the flow therefrom merging in a line 213. The line 213 has a filter 214 and communicates with a filter bypass 216, with the outflows therefrom merging in a line 218 which is downstream of a bypass 220 connected to the branch outlet line 208. The line 218 supplies a plurality of lines, indicated diagrammatically at 221, which supply a plurality of orifice jet units, indicated generally at 240, and a return line 232 to the gearbox sump 229 includes a relief valve 230 which maintains lubricating oil pressure at the orifice jet units. A scavenge pump 234 operates to return oil from the sump of the gearbox housing to the internal tank 204 through a line 236 which communicates with the line 222 downstream of the variable orifice 224.

It will be noted that there are 13 orifice jet units, indicated generally at 240, provided for proper lubrication of the aircraft accessory gearbox illustrated in FIG. 1 as compared to the prior art system illustrated in FIG.

3, using 18 orifice jet units for the same accessory gearbox.

Further, the orifice jet units, indicated generally at 240 in FIG. 4, differ in construction from those used in the prior art system and have orifices of various sizes to provide only that amount of lubricating and cooling oil required at a particular area within the housing of the gearbox.

In the prior art, all of the orifice jet units had orifices of approximately 0.030", as previously stated, while, in the new and improved lubricating system, a number of the orifices are of a smaller size down to 0.010" in diameter.

The accessory gearbox has a cast housing with a number of the lubricant flow passages being formed during the casting process. The casting uses core sand to define the passages. This core sand has particles up to a diameter slightly less than 0.030" and, therefore, in the prior art, it has been necessary to have the orifice jet units sufficiently large in order to preclude clogging by the core sand. This has resulted in excess flow of lubricating and and cooling oil to various components within the gearbox. This has resulted in excess heat rejection, as previously stated.

Figure 5:
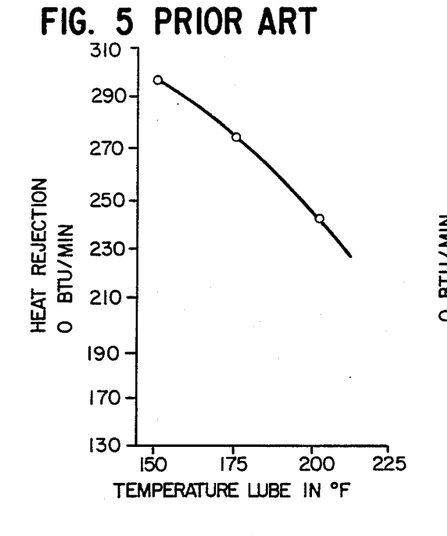
FIG. 5 is a graph illustrating heat rejection in the prior art gearbox.
Figure 6:
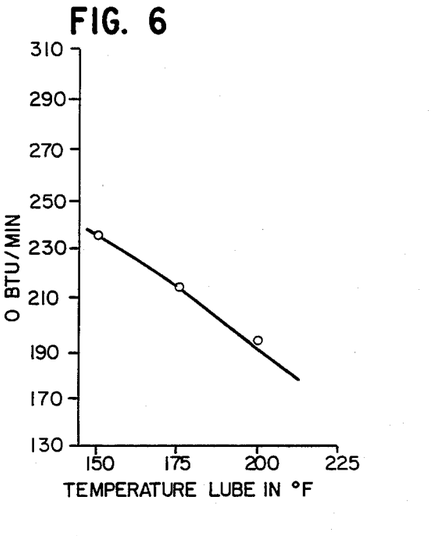
FIG. 6 is a graph, similar to the graph of FIG. 5, illustrating reduced heat rejection in the gearbox embodying the invention.

The heat generation at the splines, gear meshes and seals is minimal. The bearings require careful determination as to the required amount of lubricating and cooling oil. Heat rejection is minimized if only adequate, rather than excess, amounts of lubricating and cooling oil are directed to various components within the gearbox. Cooling requirements of the specific elements of a gearbox were determined analytically or by test, resulting in a finding that where the prior art had all of the orifice jet units of 0.030" diameter, a number of the orifice jet units could be of a reduced diameter to deliver less lubricating and cooling oil and, thus, reduce viscous drag and churning losses in the gearbox. In a practical embodiment, certain of the orifice jet units can be reduced to 0.010". Overall, the orifices range in size from 0.010" to 0.030". Additionally, because of flow patterns of lubricating and cooling oil, it was determined that certain orifice jet units could be eliminated. An illustrative example of the reduction in heat rejection is provided by a comparison of FIGS. 5 and 6. The prior art accessory gearbox having all of the orifice jet units of 0.030" has the relation between heat rejection and the temperature of the lubricating and cooling oil as shown in FIG. 5 and FIG. 6 shows a much lower rate of heat rejection with the improved lubricating and cooling oil flow provided by the reduced size orifice jet units.

An example of the analytical method for determining oil flow for a bearing is measuring heat rejection for a bearing by determining the viscous torque for the bearing. The following equation for viscous torque for bearings operating at moderate speeds and not under excessive loads is known.

$$M_v = 1.42 \times 10^5 f_o (V_o N)^{2/3} dm^3 \text{ or}$$

$$M_v = 3.492 \times 10^{-3} f_o dm^3 \text{ equal to 2000.}$$

Where:
$M_v$ = Bearing viscous torque (in.-lb.)
$dm$ = Bearing mean diameter (in.)
$f_o$ = Constant Dependent on Bearing Type
$V_o$ = Lubricant Kinematic Viscosity (cs)
$N$ = Bearing Speed (rpm)

The foregoing is provided in a publication of A. Palmgren entitled *Ball and Roller Bearing Engineering*, 3rd ed., John Wiley and Sons, New York/London/Sidney 1959, pp. 34–41. This same reference provides values of $f_o$ for use in the foregoing equation.

Testing to determine required flow of oil can be accomplished by reducing oil flow to the bearings, splines, face seals and gear meshes in steps in successive runs and, after each run, checking of the components for lack of distress. Examples of distress are: for bearings, a bluish effect; for splines, fretting; for face seals, discoloration; and for gears, spalling. A rate of flow can then be determined acceptable based on the observations of the components.

Figure 7:
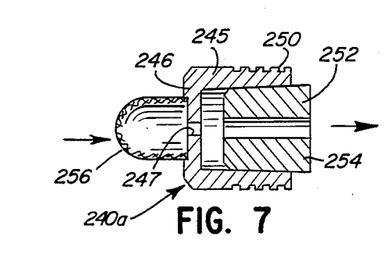
FIG. 7 is a central, longitudinal section of a first form of orifice jet unit.
Figure 8:
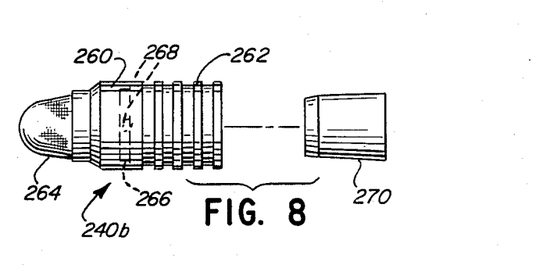
FIG. 8 is an exploded elevational view of a second form of orifice jet unit.
Figure 9:
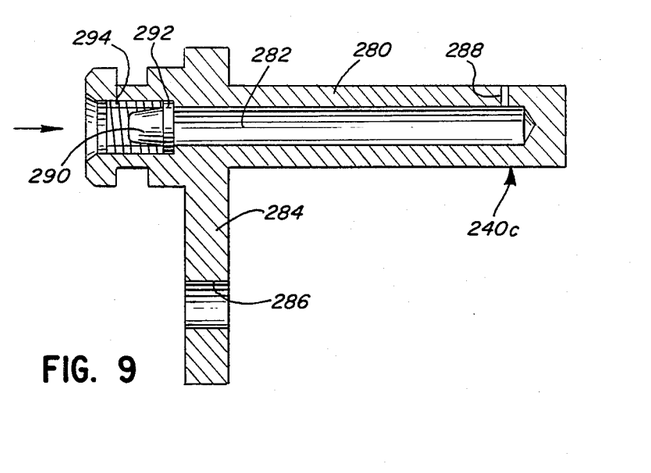
FIG. 9 is a central, longitudinal section of a third form of orifice jet unit.

The desired rate of flow of coolant and lubricating flow through the orifice jet units is provided by the orifice jet unit structures shown in FIGS. 7 to 9. The orifice jet unit 240a, shown in FIG. 7, has a cup-shaped body 245 with an end wall 246 having an orifice 247. The body 245 can fit into a cored passage in the housing of the gearbox and is locked in position by peripheral locking grooves 250 which are expanded outwardly by forcing inwardly of a tapered locking plug 252 having a central passage 254 in alignment with the orifice 247. Flow of lubricating and cooling oil is from left to right, as indicated by the arrows in FIG. 7, and in order to have the orifice 247 of a diameter less than the size of core sand particles, a filter in the form of a screen 256, shown as a dome-shaped member, is secured to the wall 246 of the body. The screen filters the flow of lubricating and cooling oil to prevent orifice-blocking core sand particles from reaching the orifice 247. An example of the screen material suitable for this purpose is a stainless steel sheet that is etched to have openings substantially smaller than 0.030" and, for example, the openings can be in the range of 0.004–0.015". The screen material selected would have openings of a size less than the smallest orifice.

Certain of the orifice jet units are constructed as shown in FIG. 8 wherein an orifice jet unit 240b has a tubular body 260 with peripheral locking grooves 262. A flow entry into the tubular body is covered by a dome-shaped screen 264 of the same construction as shown in FIG. 7. An apertured disc 266 is fitted within a chamber of the tubular body and has a central orifice 268 for flow of lubricating and cooling oil therethrough. A locking plug 270 of the same construction as the locking plug 252 can be pressed into the tubular body 260 to expand the body into locked relation with the accessory gearbox housing passage wall and with flow of lubricating and cooling oil being through a central passage (not shown) in the locking plug 270.

A third form of orifice jet unit 240C is shown in FIG. 9 wherein an L-shaped member has a first leg 280 thereof formed with an interior passage 282 extending lengthwise thereof. A second leg 284 has an opening 286 to receive an attaching bolt whereby the orifice jet unit 240c can be mounted in position for delivering lubricating and cooling oil to a gear mesh at a distance from the mounting location. This is accomplished by one end of the passage 282 having an orifice 288 which can extend normal to the passage, as shown in FIG. 9, or can extend at any desired angle therefrom. Flow of lubricating cooling oil is from left to right, as seen by an arrow in FIG. 9. A filter, in the form of a dome-shaped screen 290, is positioned at the left-hand end of the passage 282, with the screen being of the same construction as described in FIGS. 7 and 8 and having a flange 292 secured thereto. The screen is retained in position by means of a spiral spring member 294 which can be torqued to a reduced diameter for insertion in the left-hand end of passage 282 against the flange 292 and then with the torque released the spring expands to tightly fit against the wall of the passage and retain the screen in position.

In each of the orifice jet units 240a, 240b, and 240c, the flow of lubricating and cooling oil to the orifice is filtered to assure that there will be no blocking of the orifice by contamination, such as core sand.

Figure 10:
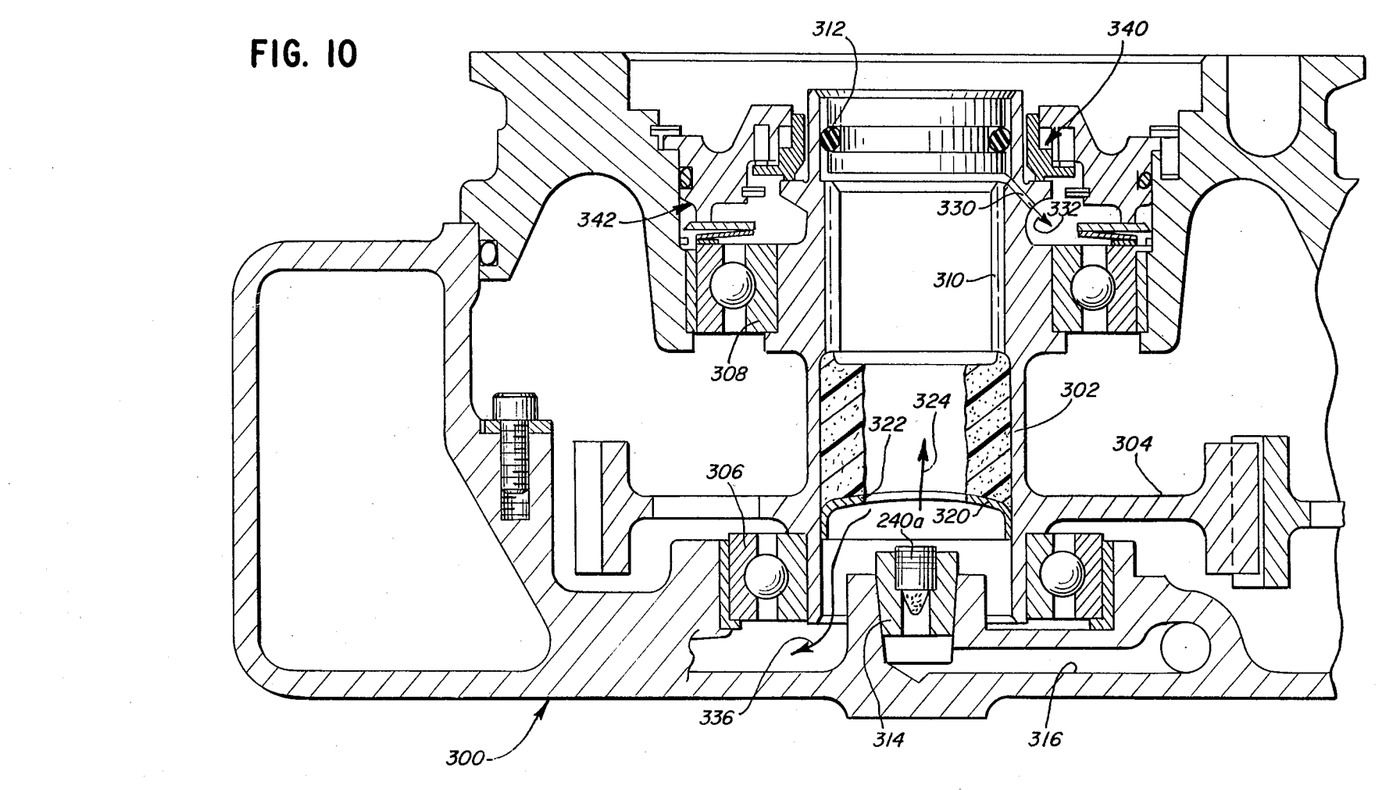
FIG. 10 is a sectional view through a portion of the aircraft accessory drive gearbox, taken centrally through a gear shaft therein.

A portion of the accessory gearbox is shown at 300 in FIG. 10 to illustrate the use of a single orifice jet unit having a reduced size orifice for lubricating a pair of bearings and a spline in place of a past lubricating arrangement wherein two of the large diameter orifice jet units were used for the same purpose with resulting delivery of excess oil and substantial heat rejection.

A gear shaft 302, having a gear 304, is rotatably-mounted in the housing by a pair of bearings 306 and 308. The gear shaft 302 is tubular to receive a connecting drive-transmitting shaft (not shown). The gear shaft 302 has a spline 310 for the drive connection and mounts an O-ring seal 312 to make a fluid-tight seal with the connecting drive shaft. An orifice jet unit 240a is fixed to a tubular member 314 mounted at the end of a cored passage 316 of the housing whereby lubricating and cooling oil can flow from the orifice jet unit in paths indicated by the arrows. A lube dam 320 is fitted within the interior of the gear shaft 302 and has a central opening 322. Because of the rotation of the gear shaft, lubricating and cooling oil flowing in the direction of arrow 324 builds up as an annular layer of oil to provide a pressure head for flow of oil through the spline 310 and through a passage 330 in the gear shaft 302 whereby the oil can flow in the direction of arrow 332 to the bearing 308 for lubrication thereof. Additionally, oil flows in the direction of arrow 336 for lubrication of the bearing 306. There is assured oil flow to the bearing 306 because of the resistance to oil flow through the spline 310 when a connecting drive shaft is splined thereto. Suitable seal structure, indicated generally at 340, seals off the exterior of the gear shaft 302 and suitable seal structure 342 seals off the bearing 308. The orifice in the orifice jet unit 240a need only be sufficiently large to provide adequate spill-over through the opening 322 in the lube dam to assure that there is lubricant flow to the bearing 306. In the prior art construction previously referred to, there were two orifice jet units each having an orifice of 0.030" diameter forming the lubrication which, in a practical embodiment of the structure shown in FIG. 10, is now accomplished by the single orifice jet unit 240a having an orifice of 0.010" diameter.

I claim:

1. A method of minimizing heat rejection in a lubricated gearbox having meshing gears, splines and bearings by providing only that amount of lubricant required for cooling thereof comprising, providing a source of unmisted lubricant, calculating and/or determining the lubrication and cooling requirements of said bearings, gear meshes, and splines, locating orifice jet units and individually sizing the orifices thereof to provide only the required flow of lubricant to said bearings, gear meshes, and splines, delivering unmisted lubricant from said source to the orifice jet units, and filtering the unmisted lubricant to those orifice jet units having orifices smaller than 0.030" in diameter and that could be susceptible to clogging due to contamination that could be in the lubricant and gearbox.

2. A method as set forth in claim 1 wherein the elements of the gearbox which include ball bearings, roller bearings, gear meshes, splines and seals and the lubrication and cooling requirements thereof are determined analytically or by test.

3. A lubrication system for a gearbox having bearings, splines and gear meshes, said lubrication system having a plurality of orifice jet units positioned in the gearbox for directing lubricating oil in measured quantities to locations for lubricating said bearings, splines and gear meshes, and means for delivering pressurized lubricating oil to said orifice jet units, the improvement comprising, the orifices of said orifice jet units being of various sizes to deliver only that amount of lubricating oil required at a particular location to minimize heat rejection, certain of said orifices being sufficiently small to be blocked by core sand or the like, and a filter associated with each of the last-mentioned orifice jet units upstream of the orifice to preclude entry of core sand or the like into said orifice, wherein an orifice jet unit has a body and said filter is defined by a screen fixed to said body, wherein said body has a generally cylindrical chamber and an open end covered by said screen, and a tapered locking plug with a central passage fitted into said chamber.

4. A lubrication system for a gearbox having bearings, splines and gear meshes, said lubrication system having a plurality of orifice jet units positioned in the gearbox for directing lubricating oil in measured quantities to locations for lubricating said bearings, splines and gear meshes, and means for delivering pressurized lubricating oil to said orifice jet units, the improvement comprising, the orifice of said orifice jet units being of various sizes to deliver only that amount of lubricating oil required at a particular location to minimize heat rejection, certain of said orifices being sufficiently small to be blocked by core and or the like, and a filter associated with each of the last-mentioned orifice jet units upstream of the orifice to preclude entry of core sand or the like into said orifice, and an orifice jet unit has a body with a pair of legs with a longitudinal passage in one of said legs, an orifice adjacent one end of the passage, a recess in said body at the other end of the passage, and a screen defining said filter mounted in said recess.

5. A lubrication system for a gearbox having bearings, splines and gear meshes, said lubrication system having first and second orifice jet units positioned in the gearbox for respectively directing lubricating oil in measured quantities to first and second locations for lubricating said bearings, splines and gear meshes, and means for delivering pressurized unmisted lubricating oil to said first and second orifice jet units for delivery of said lubricating oil to the first and second locations, the improvement comprising, the orifices of said first and second orifice jet units having diameters individually sized to deliver only that amount of lubricating oil required at the first and second locations to minimize heat rejection, at least one said orifices having a diameter between 0.010–0.030 inch so as to be susceptible to being blocked by core sand or the like, and a filter associated with each of the first and second orifice jet units upstream of the orifice, the filter on each of the orifice jet units having means to block passage of foreign matter having a diameter larger than the diameter of the orifice with which each said filter is associated to preclude entry of core sand or the like into said orifices.

6. A lubrication system as defined in claim 1 wherein one of the orifice jet units has a body and said filter is defined by a screen fixed to said body.

7. A lubrication system as defined in claim 3 wherein said screen is formed of metal etched to have openings of 0.004–0.015″ diameter.

8. A lubrication system as defined in claim 6 wherein said body has the orifice formed therein.

* * * * *